Dec. 2, 1930.  H. S. BROADWELL ET AL  1,783,494
FISHING REEL
Filed Feb. 7, 1929
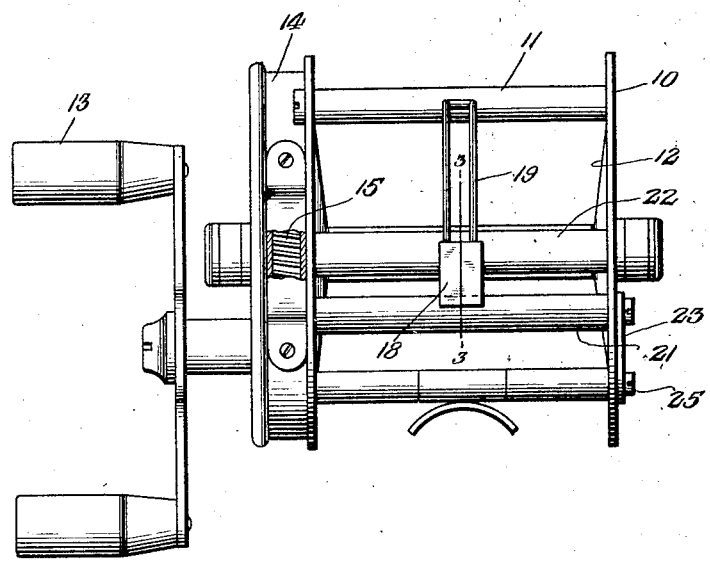
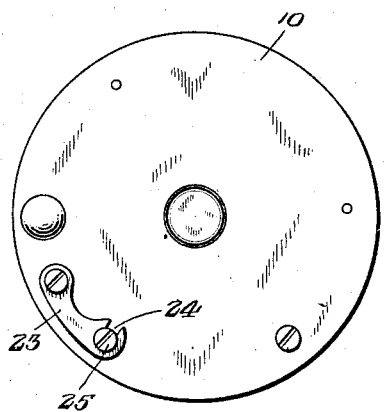
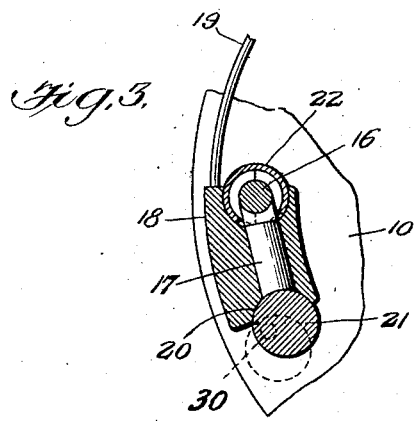

Patented Dec. 2, 1930

1,783,494

UNITED STATES PATENT OFFICE

HALVOR S. BROADWELL AND SAMUEL T. THORPE, OF BRISTOL, CONNECTICUT, ASSIGNORS TO THE HORTON MANUFACTURING COMPANY, OF BRISTOL, CONNECTICUT, A CORPORATION OF CONNECTICUT

FISHING REEL

Application filed February 7, 1929. Serial No. 338,171.

This invention relates to fishing reels and especially to line guides or level winding devices therefor.

These guides or level winding devices are now quite common but in the past they have usually been so constructed as to present certain difficulties when rendered inoperative for any reason. That is, if the device becomes inoperative, the reel must be taken apart to dismount the line guide for purposes of repair. When this occurs during usage of the reel, it is rather inconvenient. Accordingly, the present invention contemplates a level wind device that can be dismounted without the necessity of disassembling any parts of the reel proper.

More specifically, the present device comprises a traversing shaft and a carriage for the line guide, said carriage being held or clamped by a retaining bar against a steadying bar and the shaft in such a position that a driving pawl in the carriage is held in operative engagement with the shaft. Said retaining bar is movable away from said shaft whereby the carriage may be released, this preferably being accomplished by having said bar journaled in the reel frame eccentrically with respect to the shaft so that rotation of the bar in one direction will clamp the carriage against the shaft while rotation in the opposite direction will release the carriage.

A further object is to provide means for releasably locking said retaining bar in its carriage clamping position.

With these and other objects in view the invention consists in certain novel details of construction and combinations and arrangements of parts, all as will hereinafter be more fully described and the novel features thereof particularly pointed out in the appended claims.

In the accompanying drawings;

Figure 1 is an elevational view of a reel embodying the present invention;

Fig. 2 is an end view of the reel;

Fig. 3 is a sectional view on the line 3—3 of Fig. 1.

The reel proper forms no part of the present invention. Hence it is shown generally as comprising a frame formed of end plates or disks 10 connected by rods 11, said disks having suitable bearings for the spool 12 which is adapted to be rotated by handle 13 through proper gearing (not shown) enclosed in a housing 14 on one of said disks. Said gearing includes a gear 15 for driving the traversing shaft 16 journaled in the end disks.

As is customary, traversing shaft 16 is formed with the usual double spiral groove adapted to be engaged by the driving pawl 17 in the carriage 18 for the line guide 19 whereby, upon rotation of the spool, the carriage with the line guide, is reciprocated longitudinally of said shaft to lay the line level of the spool.

As before mentioned, it is desirable that the carriage 18 be easily demounted in order that repairs may be made if the level winding attachment becomes inoperative or in order that the reel may be used without the attachment under such circumstances. In the present instance this result is obtained by clamping the carriage in its operative position by means movable relatively to the traversing shaft whereby the carriage may be released and removed by simply moving such clamping means away from the shaft. The preferred construction illustrated, consists in having the outer face of the carriage formed with a concave surface or recess 20 conforming to the periphery of a bar 21 journaled eccentrically, as indicated at 30, in the end plates 10, said bar 21 being disposed parallel with respect to the shaft 16. When rotated in one direction the surface of the bar 21 is moved toward shaft 16, clamping the carriage against or on the shaft and a steadying bar 22. When rotated in the opposite direction, the space between shaft 16 and this retaining bar is increased to such an extent as to allow the carriage to be slipped out from between those members.

Various means, of course, may be utilized for rocking the retainer bar. For instance, on the end of the retainer bar exteriorly of one of the end plates, there is mounted a lever 23 by which the bar may be rotated. To securely hold the bar in carriage locking position, said lever has a notch 24 thereon so that the lever may be moved under the head of a screw 25 threaded through the end plate and extending into one of the rods 11 of the reel frame. Normally, the lever is clamped under the head of said screw but when it is desired to remove the carriage, the screw need only be loosened and the lever freed so as to permit turning the retainer bar.

With this arrangement, the line guiding carriage may be quickly removed without the necessity of disassembling the reel proper. This is quite advantageous, especially when the line guiding attachment becomes inoperative while the reel is in use.

What we claim is:

1. In a fishing reel, a frame, a spool, a traversing shaft, a line guide carriage, a pawl in said carriage, and a retaining bar normally supporting said carriage in position with said pawl engaging said shaft, said bar being movable laterally toward and from said shaft.

2. In a fishing reel, a frame, a spool, a traversing shaft, a line guide carriage, a pawl in said carriage, and a retaining bar having an offset portion normally engaging said carriage to hold the pawl in engagement with said shaft, said bar being movable laterally away from said shaft to release the pawl and carriage.

3. In a fishing reel, a frame, a spool, a traversing shaft, a line guide carriage, a pawl in said carriage, and a retaining bar engaging said carriage, said bar being pivoted to move laterally toward and from said shaft whereby said carriage may be releasably held in position with the pawl in engagement with said shaft.

4. In a fishing reel, a frame, a spool, a traversing shaft, a retaining bar, a carriage positioned between said shaft and bar, means for moving said bar laterally toward and from said shaft, and a pawl in said carriage adapted to co-act with said shaft.

5. In a fishing reel, a frame comprising end members, a spool, a traversing shaft, a retaining bar extending parallel to said shaft and eccentrically journaled in said end members, a line guide carriage between said shaft and bar, a pawl in said carriage, and means for rocking said bar to hold the carriage in position with said pawl in engagement with said shaft.

6. In a fishing reel, a frame, a spool, a traversing shaft, a retaining bar extending parallel to said shaft and journaled eccentrically in said frame, a line guide carriage between said bar and shaft, a pawl in said carriage adapted to engage said shaft, means for rocking said bar to release the carriage from between said bar and shaft, and means for locking said bar against rocking movement.

7. In a fishing reel, a frame, a spool, a traversing shaft, a line guide carriage, a pawl in said carriage adapted to engage said shaft, and a retaining bar extending parallel to said shaft and normally engaging said carriage to force the pawl into enagement with the shaft, the surface of said bar normally engaging said carriage being movable laterally away from shaft to release said pawl.

8. In a fishing reel, a frame, a spool, a traversing shaft, a guard for said shaft, a retaining bar, a line guide carriage clamped between said bar and guard, a pawl in said carriage adapted to co-act with said shaft, and means for moving the retaining bar laterally away from said guard to release the carriage and pawl.

9. In a fishing reel, a frame, a spool, a traversing shaft, a guard for said shaft, a retaining bar, a line guide carriage clamped between said bar and guard, a pawl in said carriage adapted to co-act with said shaft, said bar being movable laterally away from said guard to release the carriage and pawl, and means for releasably locking said bar against movement.

10. In a fishing reel, a frame, comprising end plates, a spool, a traversing shaft, a guard for said shaft, a retaining bar journaled eccentrically in said end plates, a line guide carriage clamped between said bar and guard, a pawl in said carriage co-acting with said shaft, and a lever at the outer face of one of said end plates for rocking said bar to release said carriage.

11. In a fishing reel, a frame comprising end plates, a spool, a traversing shaft, a guard for said shaft, a retaining bar journaled eccentrically in said end plates, a line guide carriage clamped between said bar and guard, a pawl in said carriage co-acting with said shaft, a lever on said bar at the outer side of one of said end plates for rocking said bar to release said carriage, and a locking screw in said end plate for normally holding said lever against movement.

HALVOR S. BROADWELL.
SAMUEL T. THORPE.